United States Patent [19]

Kanbe et al.

[11] 4,139,085
[45] Feb. 13, 1979

[54] DRY DISC-TYPE CLUTCH

[75] Inventors: Yasuhide Kanbe, Toyota; Shigemichi Yamada, Nishio; Tadashi Nakagawa, Toyota; Mitsuyuki Noguchi, Nagoya, all of Japan

[73] Assignee: Toyota Jidosha Kogyo Kabushiki Kaisha, Aichiken, Japan

[21] Appl. No.: 720,083

[22] Filed: Sep. 2, 1976

[30] Foreign Application Priority Data

Dec. 16, 1975 [JP] Japan .............................. 50-168936[U]
Apr. 15, 1976 [JP] Japan .............................. 51-46043[U]

[51] Int. Cl.² ............................................. F16D 13/64
[52] U.S. Cl. ............................. 192/107 R; 192/107 C; 192/113 A
[58] Field of Search ........... 192/107 R, 107 C, 113 B, 192/113 A

[56] References Cited

U.S. PATENT DOCUMENTS

| 384,268 | 6/1888 | Nelson | 192/113 A |
|---|---|---|---|
| 2,107,954 | 2/1938 | Morton et al. | 192/107 R X |
| 2,516,544 | 7/1950 | Breeze | 192/113 B |
| 3,171,527 | 3/1965 | Ott | 192/107 R X |
| 3,380,566 | 4/1968 | Cook | 192/107 |
| 3,587,803 | 6/1971 | Sugiura | 192/107 C |
| 3,921,777 | 11/1975 | Rist | 192/107 C |
| 4,027,758 | 6/1977 | Gustavsson et al. | 192/113 B |

FOREIGN PATENT DOCUMENTS

| 15455 | 4/1969 | Japan. | |
|---|---|---|---|
| 22992 | 4/1973 | Japan. | |
| 7302 of | 1904 | United Kingdom | 192/107 R |
| 656370 | 8/1951 | United Kingdom. | |

*Primary Examiner*—William F. O'Dea
*Assistant Examiner*—Harold Joyce
*Attorney, Agent, or Firm*—Toren, McGeady and Stanger

[57] ABSTRACT

A clutch of the single-plate dry-disc type is structured to include annular friction facings secured to opposite surfaces of a supporting plate of a clutch plate and a plurality of recesses or shallow grooves are defined in the surface of one of the annular friction facings. The shallow grooves extend from the inner periphery of the one annular friction facing and terminate short of the outer periphery thereof.

Accelerated air streams are introduced from the exterior through the fly wheel into the plurality of grooves so as to aid in separation of the friction facing of the clutch plate from the engaging surface of a fly wheel as a result of a hydrodynamic force created by the air streams. Furthermore, slots are defined in the surface of the friction facing in addition to the grooves so as to provide discharge passages for powder which has been produced due to wear or attrition of the friction facings.

12 Claims, 38 Drawing Figures

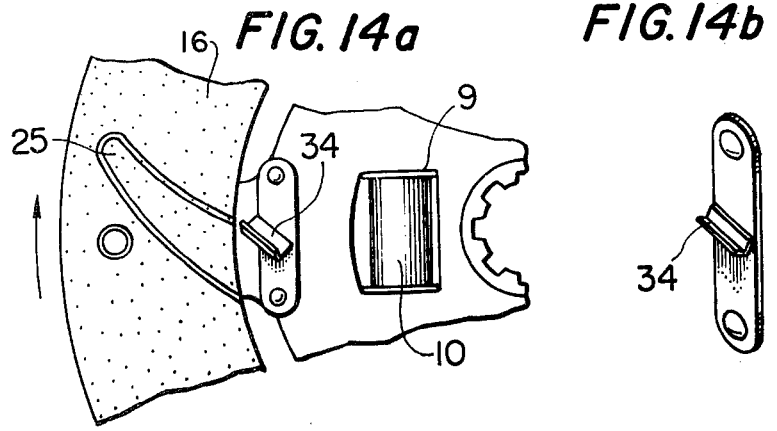
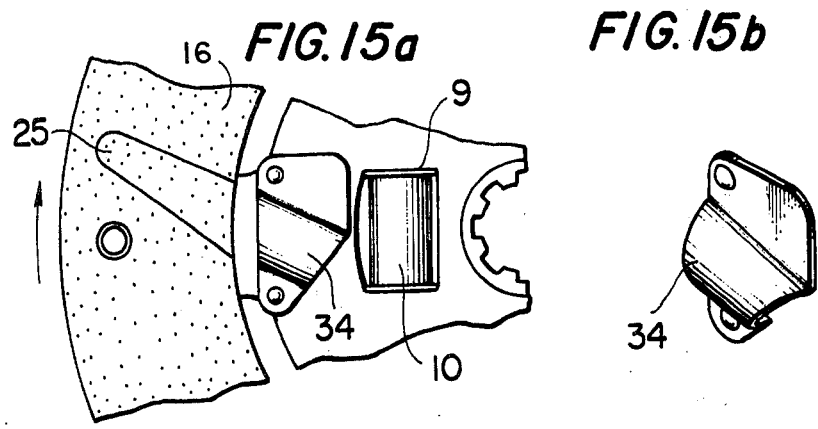
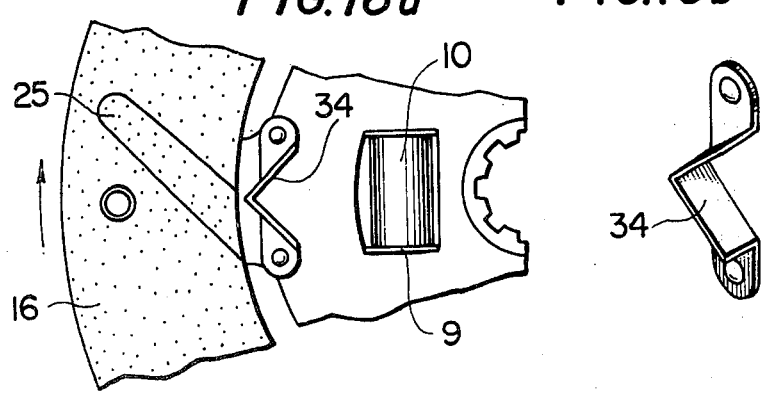

DRY DISC-TYPE CLUTCH

BACKGROUND OF THE INVENTION

1. Field of the Invention

The present invention relates to a dry-disc type clutch, and more particularly to a clutch of the type which includes a fly wheel having an annular engaging surface and secured on a drive shaft, a clutch plate axially slidably supported on a driven shaft which is positioned in coaxial relationship to the drive shaft, annular friction facings secured to opposite surfaces of the clutch plate, and an annular pressure plate adapted to urge the friction facings of the clutch plate against the engaging surface of the fly wheel.

2. Description of the Prior Art

A clutch of the type described is generally positioned intermediate the crank shaft of an engine and the input shaft of a transmission. A fly wheel in the clutch is secured on an engine crank shaft i.e., a drive shaft for the clutch, and is configured with an annular engaging surface. Provided in engageable relationship to the annular engaging surface of the fly wheel is one of a pair of annular friction facings secured to a clutch plate having a hub which is slidingly fitted in splines of an input shaft for the transmission, i.e., the driven shaft of the clutch. One of the friction facings of the clutch plate is urged by means of an annular pressure plate against the engaging surface of the fly wheel, whereby a torque from the engine is transmitted through the medium of the fly wheel and clutch plate to the input shaft of the transmission.

However, clutches of the type described suffer from disadvantages in that, even if the clutch is brought into a disengaged position, the friction facings of the clutch plate tend to maintain contact with the engaging surface of the fly wheel, so that torque is transmitted through the crank shaft of the engine to the input shaft of the transmission, resulting in failure in changing over the speeds by the transmission.

It is, accordingly, a principal object of the present invention to provide a dry-disc type clutch which features characteristics of enhanced separation action of one of the friction facings of a clutch plate from an engaging surface of a fly wheel as a result of hydrodynamic forces produced by air streams generated in the clutch assembly.

It is another object of the present invention to provide a dry-disc type clutch which provides discharge passages for powder produced due to wear or attrition of the friction facings of the clutch.

SUMMARY OF THE INVENTION

According to the present invention, there is provided a dry-disc type clutch including a fly wheel having an annular engaging surface and secured on a drive shaft or a crank shaft of an engine; a clutch plate which is axially slidably supported on a driven shaft or an input shaft of a transmission, which is coaxial with the drive shaft; annular friction facings secured to the opposite surfaces of a supporting plate of the clutch plate; an annular pressure plate adapted to urge one of the friction facings of the clutch plate against the engaging surface of the fly wheel, said clutch being characterized in that air inlets are defined in the body of the fly wheel to extend therethrough in communication with shallow grooves defined in a surface of one of the friction facings which faces the engaging surface of the fly wheel. Fins or vanes are formed on the inner surface of the fly wheel whereby air flow accelerated by the fins or vanes is directed in the radially outward direction of the fly wheel so as to be introduced under a given pressure into the aforementioned grooves to aid in separation of the friction facing from the engaging surface of the fly wheel as a result of hydrodynamic force created by the air streams.

According to one aspect of the present invention, the grooves extend from the inner periphery of a friction facing and terminate a distance short of the outer periphery thereof, with the width of each groove progressively decreasing in a depthwise direction when viewed in a transverse cross section of the friction facing.

According to another aspect of the present invention, the direction of each groove extends in a radially outward direction of the friction facing and is inclined toward the direction in which the clutch plate is rotating.

According to a further aspect of the present invention, a plurality of cushion-plate-springs having a waved form are sandwiched between one friction facing and a complementary friction facing so as to impart a waved configuration to surfaces of the friction facings, with the result that there are defined gaps of a wedge form between the engaging surface of the fly wheel and a surface of the friction facing opposite thereto. Due to the aforesaid gaps of wedge form, a thrust is produced therein so as to aid in separation of the friction facing from the engaging surface of the fly wheel.

According to a yet further aspect of the present invention, a plurality of guide pieces are provided at the entrances of the aforementioned grooves in order to smoothly guide air streams into the grooves.

According to a still further aspect of the present invention, a plurality of slots are defined in the surface of a friction facing which faces the engaging surface of a fly wheel, thereby providing discharge passages for powder which has been produced due to wear or attrition of the friction facings.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 13 to FIG. 16 are views showing fins for guiding air streams, FIGS. 13(a), 14(a), 15(a) and 16(a) being illustrative of attaching positions of the fins and with FIGS. 13(b), 14(b), 15(b) and 16(b) being perspective views of the fins;

DESCRIPTION OF THE PREFERRED EMBODIMENTS

Figure 1:
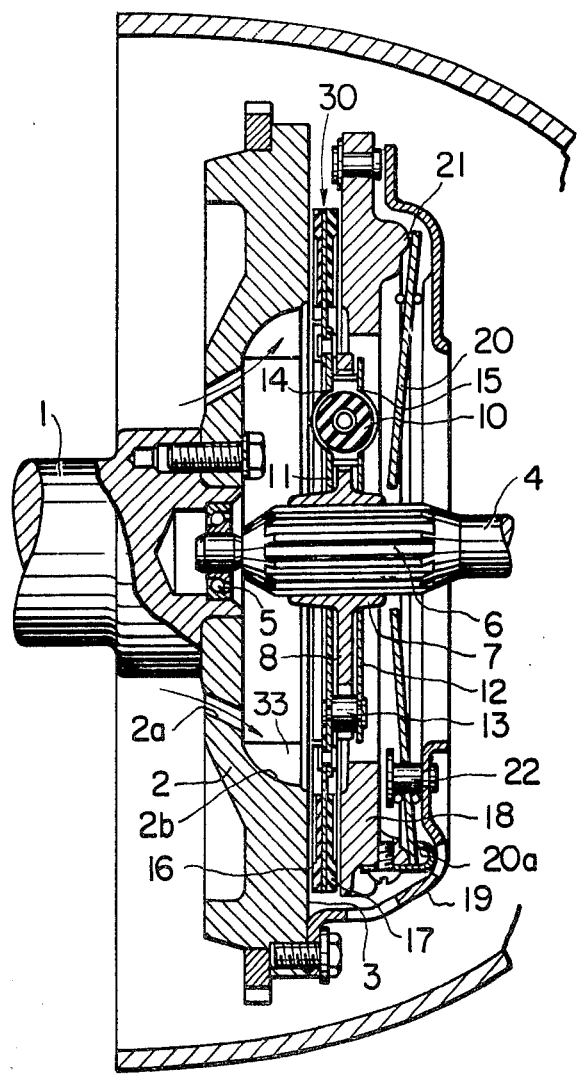
FIG. 1 is a cross sectional view taken along the center axis of a clutch according to the present invention.
Figure 2:
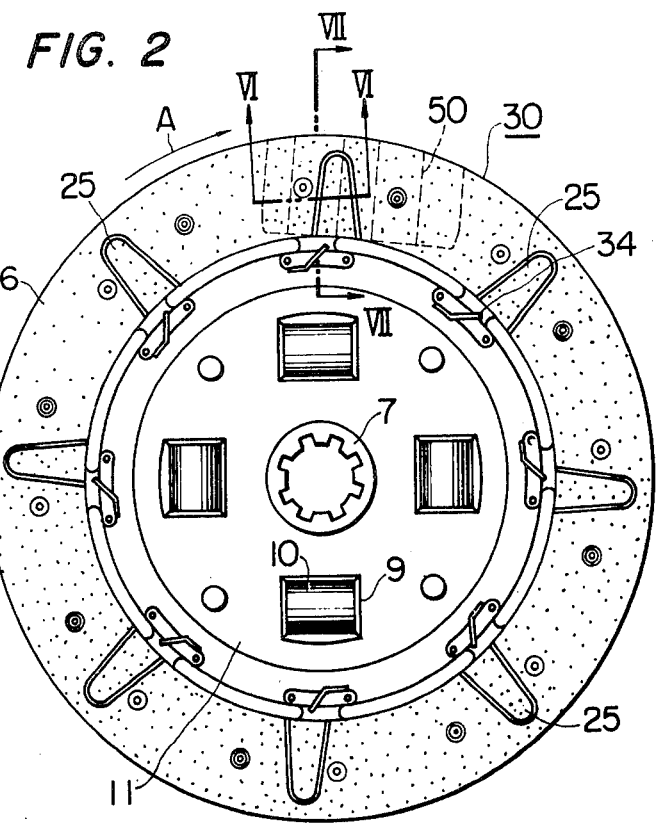
FIG. 2 is a front view of a clutch plate of the clutch.

Referring to the drawings, wherein like reference characters refer to similar parts throughout the various figures thereof, there is shown in FIGS. 1 and 2 a fly wheel 2 secured to a crank shaft 1 of an engine by means of fastening means such as bolts. The fly wheel 2 is formed with an annular friction engaging surface 3. In addition, air inlets 2a are defined through the fly wheel 2 in positions close to the center of the fly wheel. The fly wheel 2 is formed with a sloped surface 2b on its inner surface in a manner to extend from its central portion to a radially inner circumference of the annular friction engaging surface 3, with fins or vanes 33 being formed on the sloped surface 2b.

An input shaft 4 for a transmission is provided in coaxial relationship with the crank shaft 1, with the shaft 4 being journaled in a bearing provided in the crank shaft 1, so that both shafts may be rotated independently of each other. The input shaft 4 for the transmission is formed with axial splines 6 therein, and a hub 7 of a clutch plate 30 has axial splines complementary thereto, so that the hub 7 may be fitted on the axial splines 6 in the input shaft 4 in a manner movable in the axial direction relative to the input shaft 4.

Defined in a flange portion 8 of the hub 7 are a plurality of openings 9 which are positioned at equal spacings along the circumference of the flange portion 8, with cylindrical springs 10 (rubber or coil) fitted in the openings. Provided on the opposite sides of the flange portion 8 of the hub 7 are an annular supporting plate 11 and an annular side-plate 12, respectively, with both plates fastened together by means of pins 13. The annular supporting plate 11 as well as the side plate are formed with openings 14, 15, respectively, in which springs 10 are fitted so as to couple the hub 7 to the supporting plate 11 in the circumferential direction.

Figure 3:
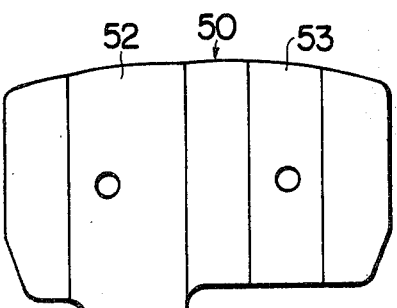
FIG. 3 and FIG. 4 are a front view and a plan view of a cushion-plate-spring, respectively.
Figure 4:
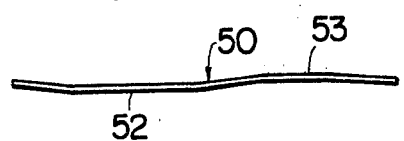
Figure 5:
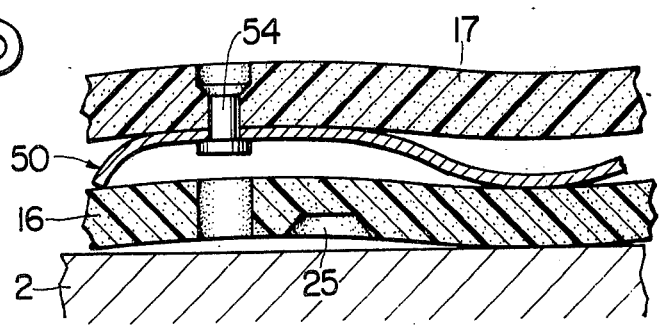
FIG. 5 is an enlarged view, partly in cross section, of the clutch plate.

Secured to and positioned along the circumference of the supporting plate 11 are a plurality of rectangular cushion-plate-springs 50 (FIGS. 3 and 4) having attaching lugs 51, respectively, and extending in the circumferential direction. The cushion-plate-springs 50 are positioned at equivalent circumferential spacings and are secured to the supporting plate 11 by means of rivets. The springs 50, which are bent in a generally S-shaped cross-sectional pattern, serve to effect smooth engagement of the clutch and to facilitate a semi-clutch operation. In addition, as shown in FIG. 5, annular friction facings 16 and 17 are secured by means of rivets 54 to protruding portions 52, 53 of the spring plate 50, the protruding portions 52, 53 protruding in a direction opposite to each other. As a result, as shown in exaggerated form in FIG. 5, the annular friction facings 16, 17 will be slightly waved in their circumferential direction because of the afore-mentioned arrangement of the facings and spring plates.

An annular pressure plate 18 urges the clutch plate 30 against the annular engaging surface 3 of the fly wheel 2. The annular pressure plate 18 however is axially movably supported by a clutch cover which is secured to the fly wheel 2. An annular diaphragm spring 20 having radially extending elongated cuts abuts a projecting portion 21 of the pressure plate 18 by means of retroceding springs 20a engaging the outer periphery of the spring 20, with an intermediate portion secured to the clutch cover 19 by means of a rivet 22.

FIG. 1 represents a condition where foot pressure is applied to a clutch pedal (not shown), so that the clutch is brought into a disengaged position. The pressure plate 18 assumes a position as shown in FIG. 1, being separated from the fly wheel by means of the retroceding springs 20a which engages the outer edge of the diaphragm spring 20.

When foot pressure is removed from the clutch pedal, the inner edge of the diaphragm spring 20 is moved to the right, as viewed in FIG. 1, through the medium of a release bearing (not shown) by means of a clutch release fork (not shown), so that the diaphragm spring 20 is pivotally moved backwards about a fulcrum, i.e., the rivet 22, whereby the outer edge of the diaphragm spring 20 is moved to the left, thereby moving the pressure plate 18 to the left through the medium of the projecting portion 21. As a result, the friction facings 16, 17 of the clutch plate 30 are sandwiched under a given pressure between the annular engaging surface 3 of the fly wheel 2 and the pressure plate 18. As a result, torque may be transmitted from the crank shaft 1 through the medium of fly wheel 2 and clutch plate 30 to the input shaft 4 of the transmission.

Figure 6A:
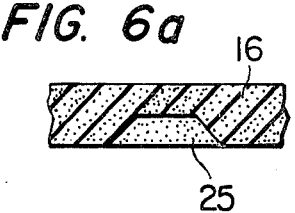
FIGS. 6(a) to (f) are transverse cross-sectional views of various grooves defined in an annular friction facing or facings in accordance with different embodiments of the invention.
Figure 6B:
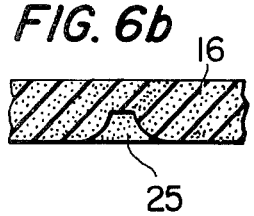
Figure 6C:
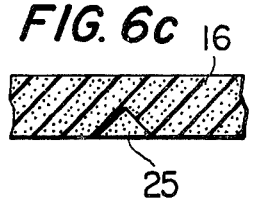
Figure 6D:
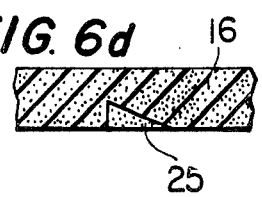
Figure 6E:
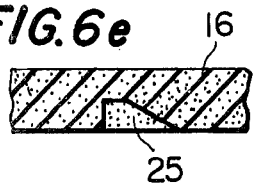
Figure 6F:
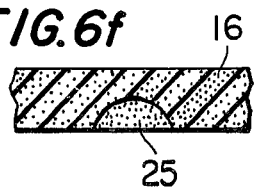

A plurality of shallow grooves 25 are defined in the surface of the annular friction facing 16 in a manner to extend from the inner periphery of the facing to a position a distance short of the outer periphery of the facing, the aforesaid grooves having widths progressively decreasing in transverse cross section from the surface of the facing to the bottoms of the grooves. The grooves 25 are positioned at circumferentially equal spacings in the surface of the facing. The shape of grooves 25 in transverse cross section may be an equilateral trapezoid (FIG. 6a), a trapezoid having concave arcuate sides (FIG. 6b), an equilateral triangle (FIG. 6c), a non equilateral triangle (FIG. 6d), a non equilateral trapezoid (FIG. 6e), or an arcuate shape (FIG. 6f).

Figure 7A:
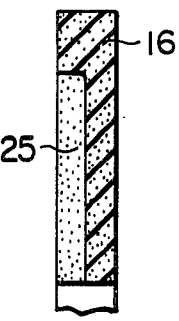
FIGS. 7(a) to (h) are longitudinal cross-sectional views of various grooves defined in the annular friction facings.
Figure 7B:
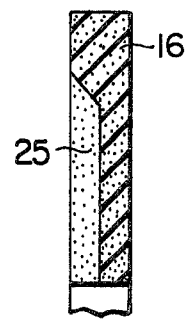
Figure 7C:
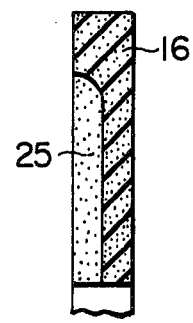
Figure 7D:
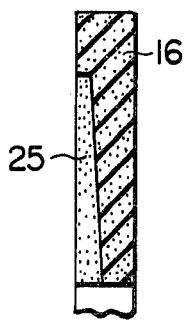
Figure 7E:
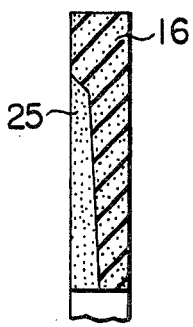
Figure 7F:
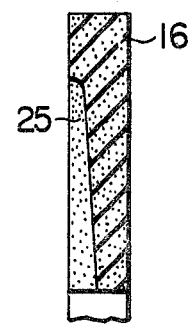
Figure 7G:
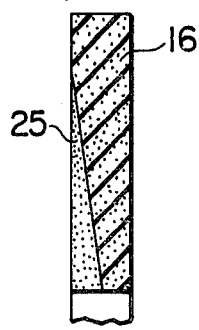
Figure 7H:
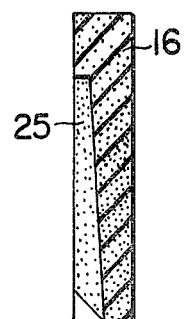

In addition, the shape of the longitudinal cross section of a groove may be formed with a constant depth along the length thereof with a square end (FIG. 7a); having a constant depth and a sloped end (FIG. 7b); having a constant depth and a rounded end (FIG. 7c); having a depth which decreases towards the tip and a square end (FIG. 7d); having a depth which decreases towards the tip and a sloped end (FIG. 7e); having a depth which decreases towards the tip, and a rounded end (FIG. 7f); having a triangular shape (FIG. 7g); and having a depth which decreases towards the tip, with a square end and a sloped starting wall (FIG. 7h).

Figure 8A:
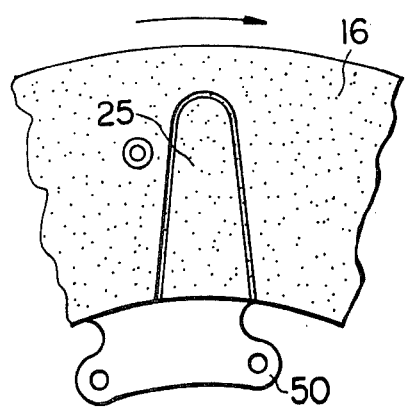
FIGS. 8(a) and (b) are front views of different grooves.
Figure 8B:
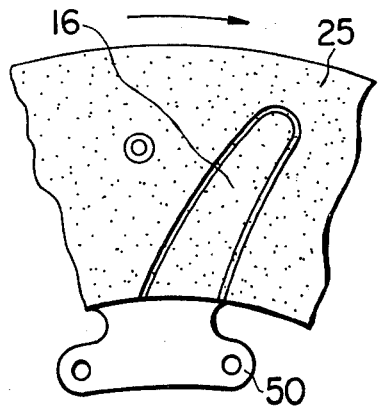

Furthermore, a longitudinal axis of the groove may be coincident with the radius of the facing or may be inclined at a given angle to the radius of the facing in the direction in which the fly wheel 2 is rotating, as shown by an arrow in FIG. 8b.

Air-flow-guiding fins or guides 34 are formed with flanges and secured to the surface of the supporting plate 11 at the entrance of each of the grooves 25 at a right angle to the surface of the supporting plate 11. The shape of fins or guides 34 may be modified as required as shown in FIGS. 13 to 16.

Figure 17:
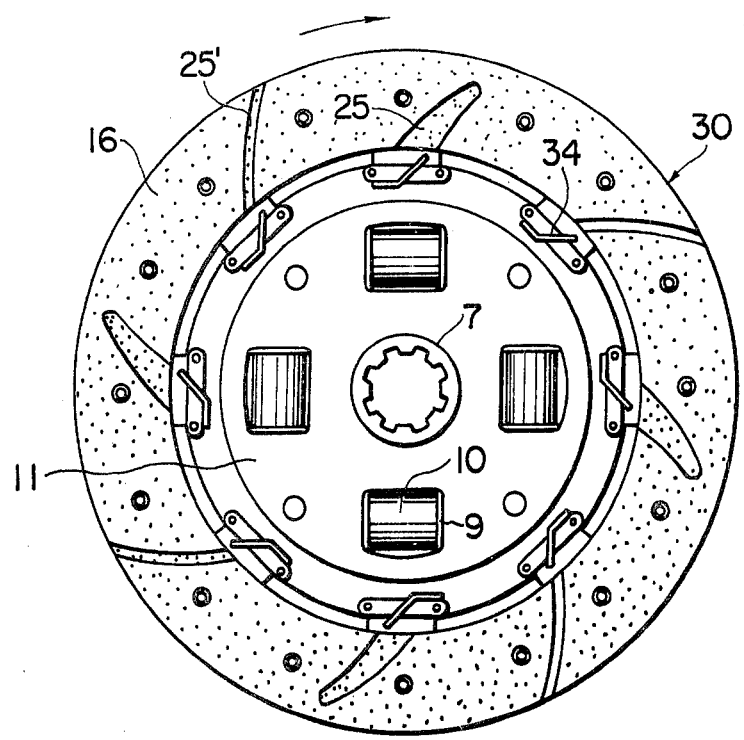
FIG. 17 is a front view of a modification of a clutch plate.

Referring to FIG. 17, there is shown a front view of a clutch plate which includes grooves whose longitudinal axis is inclined toward the direction of rotation of the clutch plate, as well as slots 25' which extend from the inner periphery of the annular friction facing 16 to the outer periphery thereof so as to provide therethrough discharge passages for powder which has been produced due to wear or attrition of the friction facings. The slots 25' are also inclined toward the direction of rotation of the clutch plate.

In operation, when the fly wheel 2, clutch cover 19 and the like rotate in the direction of arrow A, as shown in FIGS. 1 and 2, then air within the clutch cover 19 will flow through the air inlets 2a radially outwards in the direction shown by arrows, according to a centrifugal force and the action of air blowing fins or vanes 33. Particularly, air prevailing in a space defined between the fly wheel 2 and the clutch plate 30 will flow radially outwards through a gap between the annular engaging surface 3 and the surface of the friction facing 16 which is opposed thereto.

Figure 9:
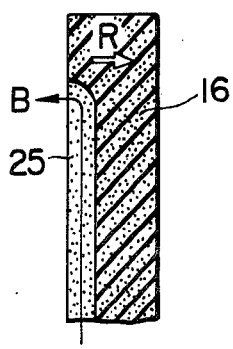
FIG. 9 is a longitudinal cross-sectional view of a groove defined in a friction facing, illustrating the action of air streams introduced into the groove.

When the clutch is brought into a released position by applying foot pressure to a clutch pedal so as to remove force from the annular pressure plate 18, then air which has been admitted through the air inlets 2a will flow radially outwardly into the grooves 25 defined in the surface of the friction facing 16 and then flow outwardly from the outer ends of the grooves as shown by an arrow B in FIG. 9. This produces a reaction R due to a change in direction of air streams. The reaction R then aids in separation of the friction facing 16 from the fly wheel 2.

Figure 10:
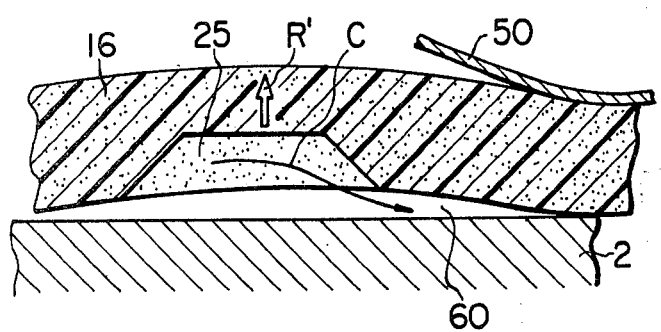
FIG. 10 is a transverse cross-sectional view of a friction facing and an engaging surface of a fly wheel, illustrating the action of air streams introduced into a groove as well as into a gap of wedge form.

Meanwhile, grooves 25 may also be provided in the surface of the friction facing 17, which faces the pressure plate 18. By itself, a reaction which has been created by air streams may not provide a force sufficient for separating the friction facing 16 from the fly wheel 2, because the density of the air may be too small, unlike the case of high speed rotation of the fly wheel. As shown in FIG. 10, since the grooves 25 are defined in a slightly waved surface of the friction facing 16, as viewed in the circumferential direction, as has been described earlier, air streams which flow out of the grooves will make ingress into wedge-shaped gaps 60 defined between the fly wheel 2 and the friction facing 16. In this respect, a thrust R' is created whose level is in inverse proportion to the square of the width of a gap 60 but in proportion to the square of the circumferential length of a wedge-shaped gap 60, as can be seen from a sliding-bearing theory disclosed in "Hydrodynamics II" edited by Yoshimasa Furuya. This thrust plus the aforesaid reaction may aid in separation of the friction facing from the fly wheel.

In practical application, however, waving of the surface of the friction facing 16 accrues from the provision of the cushion-plate-springs 50 as well as from non uniformity of pressure being applied to the surface of the facing, differences in the amount of work, variation in cooling, non uniformity in the material which constitutes facings, and the like, so that there result wedge-shaped gaps between the friction facing and the fly wheel. Thin air layers present in the wedge-shaped gaps largely contribute to effective separation of the friction facing from the fly wheel.

Figure 11:
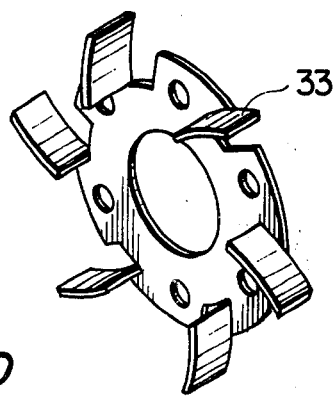
FIG. 11 and FIG. 12 are a perspective view and a front view, respectively, of fins or vanes formed on the inner surface of a fly wheel.
Figure 12:
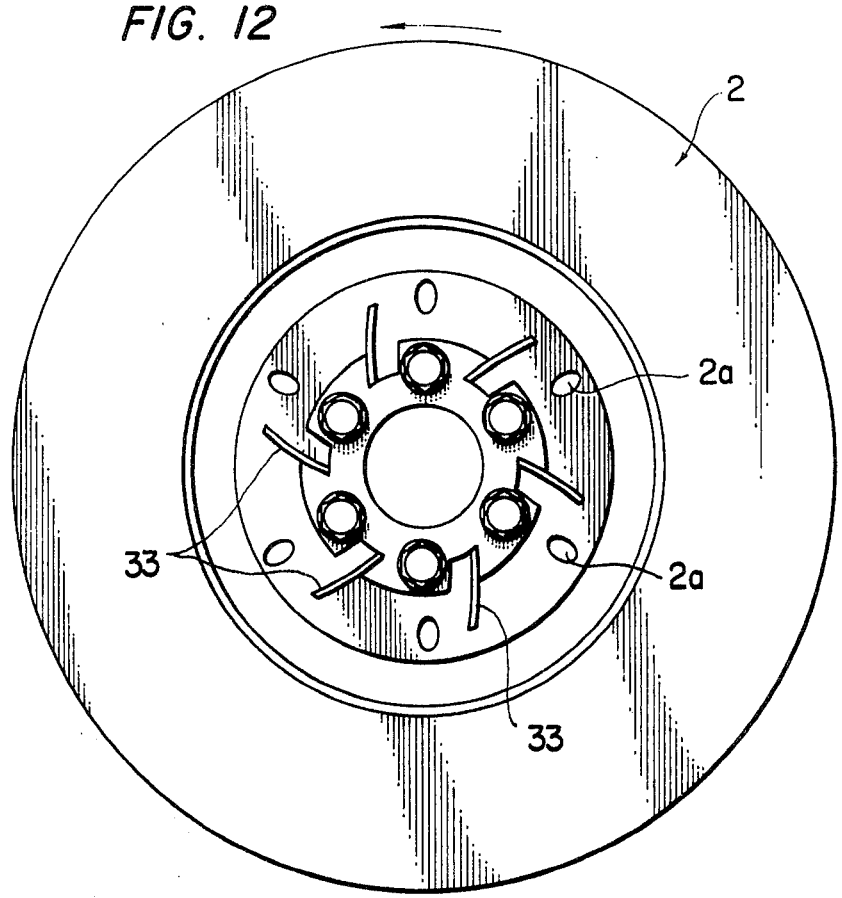

Turning to FIGS. 11 and 12, the fins or vanes 33 may be fabricated in an integral fashion with the fly wheel according to a casting technique or according to a sheet metal forming technique using a press, and then secured to the fly wheel.

Figures 13A, 13B:
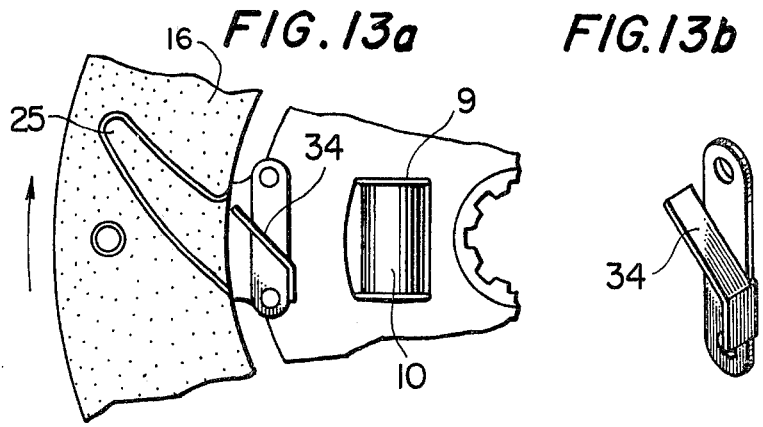

FIGS. 13 to 16 show the arrangement and modifications of the guides 34 which are located at the entrance of each groove 25. As shown, various shapes of guides may be used for guiding air streams into the grooves 25. In FIG. 13, the guide 34 is provided in the form of a simply bent plate which is in alignment with one of walls of the groove 25. FIG. 14 shows a guide 34 which is also bent so as to provide a barrier for air streams so as not to pass over the entrance of the groove. FIG. 15 shows a guide 34 which is punched out into a semi cylindrical shape, and FIG. 16 shows a guide 34 which is bent into a 'V' shape so as to provide a guiding surface for air streams.

FIG. 17 shows a front view of the clutch plate, in which a plurality of slots 25' inclined in the direction of rotation of the clutch plate are defined in the surface of a facing like the grooves 25 which are also inclined in the same direction as that of the slots 25'. The slots 25' serve as discharge passages for powder from friction facings 16, 17, which powder has been produced because of wear or attrition of the facings.

Figure 18:
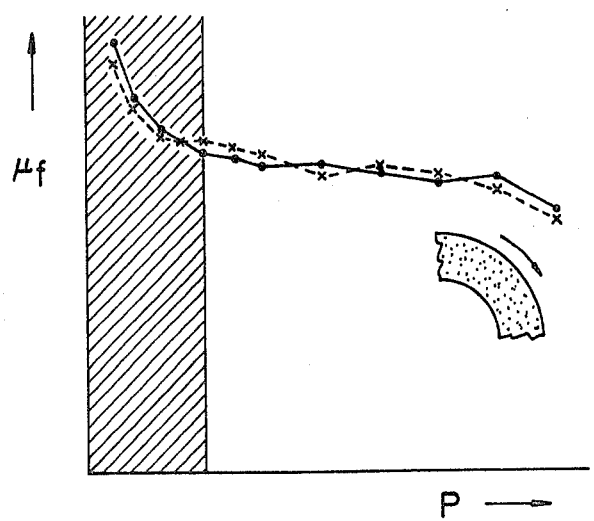
FIG. 18 to FIG. 21 are plots showing friction characteristics of clutch plates, respectively.
Figure 19:
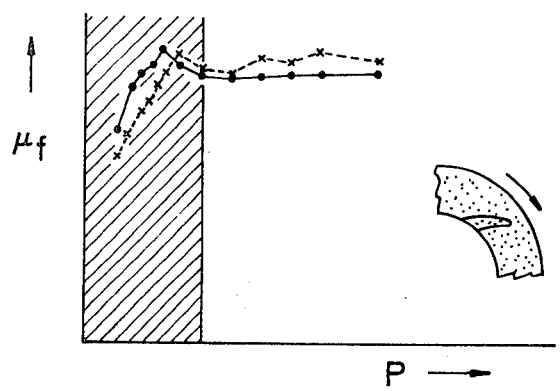
Figure 20:
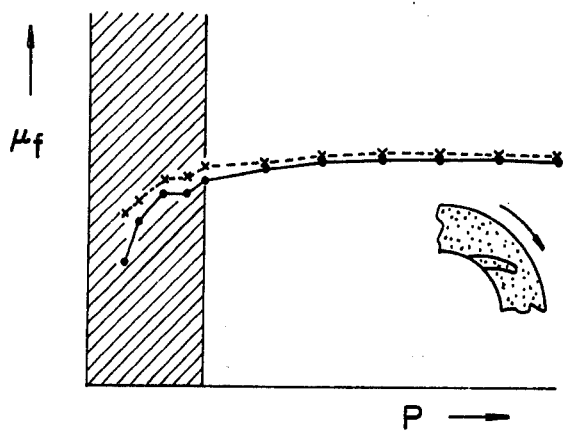
Figure 21:
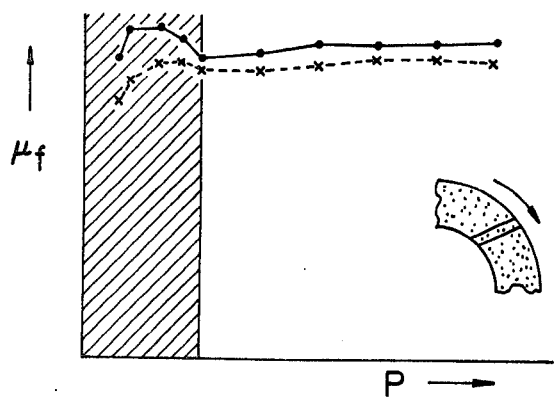

FIGS. 18 to 21 are plots showing the relationship between an apparent coefficient of friction and a pressure being applied to a facing. FIG. 18 refers to a case where no groove is defined in the surface of the facing 16. FIGS. 19 and 20 refer to cases where grooves as shown in FIG. 8 are provided in the surface of the friction facing 16. In this case, the type of a material used in FIG. 19 differs from that used in FIG. 20. FIG. 21 refers to a case where grooves which extend from the inner periphery of the facing to the outer periphery thereof in the radial direction are defined in the surface of the friction facing 16. The comparison of FIG. 18 with FIGS. 19 to 21 indicates different improvements in the separating characteristics of a clutch.

While the present invention has been described herein with reference to certain exemplary embodiments thereof, it should be understood that various changes, modifications and alterations may be effected without departing from the spirit and the scope of the present invention, as defined in the appended claims.

What is claimed is:

1. In a dry-disc type clutch assembly which includes a drive shaft and a driven shaft coaxial with said drive shaft, a fly wheel having an annular engaging surface secured on said drive shaft, a clutch plate axially slidably supported on said driven shaft, a supporting plate of said clutch plate, annular friction facings secured to opposite surfaces of said supporting plate and an annular pressure plate operative to urge one of said friction facings against said engaging surface of said fly wheel, said one friction facing having a facing surface which faces said engaging surface of said fly wheel, a plurality of waved cushion-plate springs sandwiched between said friction facings, so as to effect waved surfaces for said friction facings, thereby creating wedge-shaped gaps between said engaging surface of said fly wheel and said facing surface of said one friction facing, said springs operating to create wedge-shaped gaps between the surface of the other of said friction facing and the surface of said pressure plate, the improvement comprising a plurality of grooves defined in said facing surface of said one friction facing, said grooves extending radially from the inner periphery thereof to a position a distance short of the outer periphery of said one friction facing, said annular engaging surface of said fly wheel which said facing surface of said one friction facing engages being formed devoid of grooves and with a generally flat planar configuration, said facing surface of said one friction facing also having formed therein a plurality of slots extending continuously from the inner periphery to the outer periphery of said one friction facing, said slots being structured to discharge powder produced in said clutch assembly due to wear or attrition of said friction facings.

2. The improvement according to claim 1 wherein said grooves and said slots are arranged alternately circumferentially about said facing surface of said one friction facing.

3. The improvement according to claim 1 wherein both said grooves and said slots are formed in said facing surface of said one friction facing to extend in a direction inclined relative to the direction of rotation of said clutch plate.

4. In a dry-disc type clutch assembly which includes a drive shaft and a driven shaft coaxial with said drive shaft, a fly wheel having an annular engaging surface secured on said drive shaft, a clutch plate axially slidably supported on said driven shaft, a supporting plate of said clutch plate, annular friction facings secured to opposite surfaces of said supporting plate and an annular pressure plate operative to urge one of said friction facings against said engaging surface of said fly wheel, said one friction facing having a facing surface which faces said engaging surface of said fly wheel, a plurality of waved cushion-plate springs sandwiched between said friction facings, so as to effect waved surfaces for said friction facings, thereby creating wedge-shaped gaps between said engaging surface of said fly wheel and said facing surface of said one friction facing, said springs operating to create wedge-shaped gaps between the surface of the other of said friction facing and the surface of said pressure plate, the improvement comprising a plurality of grooves defined in said facing surface of said one friction facing, said grooves extending radially from the inner periphery thereof to a position a distance short of the outer periphery of said one friction facing, said annular engaging surface of said fly wheel which said facing surface of said one friction facing engages being formed devoid of grooves and with a generally flat planar configuration, said grooves at their radially outermost ends being configured to react to air flow therethrough to produce a reactive force against said one friction facing, said force being developed by said configuration of said grooves to extend in a direction tending to drive said one friction facing away from engagement with said annular engaging surface of said fly wheel as a result of air flow through said grooves, and means for inducing air flow into said grooves.

5. The improvement according to claim 4, further comprising a plurality of grooves defined in the other of said friction facings.

6. The improvement according to claim 4, wherein said grooves are inclined toward the direction of rotation of said clutch plate.

7. The improvement according to claim 4, wherein each of said grooves comprises a width as viewed in transverse cross section which decreases towards the bottom of said groove.

8. The improvement according to claim 4, wherein each of said grooves comprises a depth which decreases towards the tip of said groove radially outwardly of said facing.

9. The improvement according to claim 4, wherein said grooves comprise tips located radially outwardly of said facing, and wherein said tips are square.

10. The improvement according to claim 4, wherein said grooves comprise tips located radially outwardly of said facing, and wherein said tips have a sloped configuration.

11. The improvement according to claim 4 wherein said means for inducing air flow into said grooves comprise guide members provided for guiding air streams into said grooves, said guide members being positioned at entrances of said grooves respectively, and secured to said supporting plate, said guide members having walls which are perpendicular to the surface of said supporting plate.

12. The improvement according to claim 4 wherein said means for inducing air flow into said grooves comprise vanes formed on the inner surfaces of said fly wheel operative to induce air streams to flow in the radially outward direction on said fly wheel and into said grooves.

* * * * *